(12) United States Patent
Rathgeb

(10) Patent No.: US 7,322,226 B1
(45) Date of Patent: Jan. 29, 2008

(54) TEASER APPARATUS FOR OFFSHORE FISHING

(76) Inventor: Peter Michael Rathgeb, 960 Evergreen Dr., Delray Beach, FL (US) 33483

( * ) Notice: Subject to any disclaimer, the term of this patent is extended or adjusted under 35 U.S.C. 154(b) by 77 days.

(21) Appl. No.: 11/234,095

(22) Filed: Sep. 26, 2005

(51) Int. Cl.
*A01K 97/00* (2006.01)

(52) U.S. Cl. .................. 73/42.15; 43/2; 43/4
(58) Field of Classification Search .............. 43/2, 43/4, 42.11, 42.15; D22/134
See application file for complete search history.

(56) References Cited

U.S. PATENT DOCUMENTS

| 2,933,847 | A | | 4/1960 | Frasure | |
|---|---|---|---|---|---|
| 3,186,120 | A | | 6/1965 | Layson | |
| 4,550,518 | A | | 11/1985 | Layson | |
| 4,607,447 | A | * | 8/1986 | Wright | 43/3 |
| 4,672,764 | A | * | 6/1987 | Dempsey | 43/4 |
| 5,749,320 | A | * | 5/1998 | Sydenstricker | 119/253 |
| 5,752,461 | A | | 5/1998 | Whisenhunt | |
| 5,906,067 | A | * | 5/1999 | Layson | 43/2 |
| 5,950,345 | A | | 9/1999 | Kilander | |
| 6,185,857 | B1 | | 2/2001 | Hnizdor | |
| 7,134,235 | B2 | * | 11/2006 | Gifford | 43/4 |
| 2004/0159037 | A1 | | 8/2004 | Gifford | |

* cited by examiner

*Primary Examiner*—Kimberly S. Smith
(74) *Attorney, Agent, or Firm*—Joseph Scafetta, Jr.

(57) ABSTRACT

A teaser apparatus for fishing includes a flat, transparent, substantially horizontally oriented, plastic sheet having a leading edge, a trailing edge, a top surface and an underside. A primary spreader bar is attached to the leading edge of the sheet. A secondary, spreader bar is attached at or near the trailing edge of the sheet. If the secondary spreader bar is attached near the trailing edge, optionally a tertiary spreader bar may be attached at the trailing edge to aid in the floatation of the entire sheet. A plurality of three-dimensional, imitation fish is attached either on a top surface or to an underside of the sheet and is made of flexible rubber. The spreader bars are made of clear plastic and may be cylindrical tubes with cross sections which may be L-shaped, circular, oval-shaped or triangular. End caps with finger grips seal opposite ends of the cylindrical tubes.

19 Claims, 3 Drawing Sheets

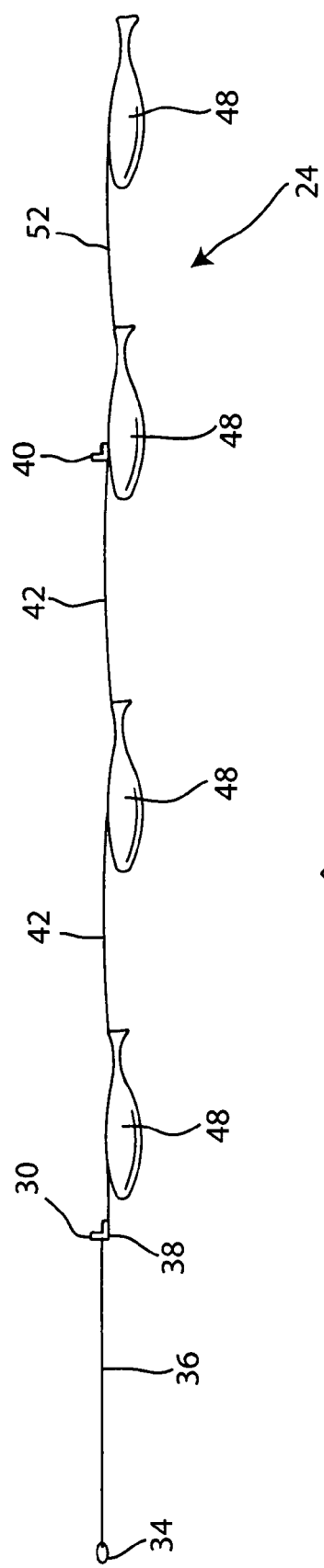
Fig. 3
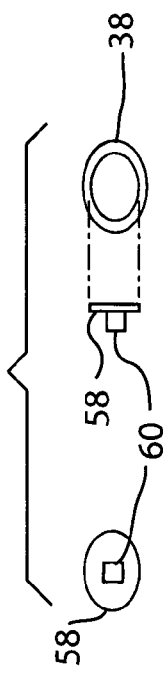
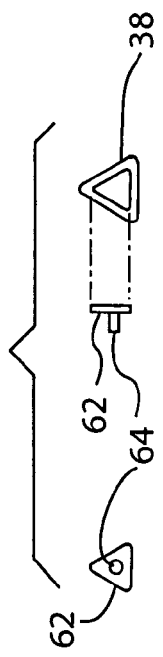
Fig. 4a
Fig. 4b
Fig. 4c

TEASER APPARATUS FOR OFFSHORE FISHING

BACKGROUND OF THE INVENTION

1. Field of the Invention

The invention relates to fishing generally and, in particular, to a teaser apparatus resembling a school of small bait fish to which large target fish will be attracted during offshore fishing in large bodies of water like oceans, seas and gulfs.

2. Discussion of the Prior Art

It has been a problem in the prior art to develop a teaser device which is simple to make and easy to use with successful fishing results. Although others have tried, their devices are complicated to make and difficult to use with undocumented fishing results. Such devices are also expensive to manufacture and consequently costly for the fishers who buy them.

In offshore fishing, these teaser devices are commonly used to attract large target fish to a boat on which fishers are waiting. Such teaser devices are usually made up of imitation plastic baits to mimic a school of smaller fish which are hookless and pulled closely behind the boat. Hooked dead fish or artificial baits are placed near the teaser device and are usually hit first by the larger target fish because the baits appear to be more vulnerable, struggling live fish. Because they are stragglers, they are a slight distance from the main group of bait fish.

This method of fishing is used when trolling at normal speeds of six or more miles per hour. These speeds are required for both the teaser device and the hooked baits to achieve a swimming-like motion. Also at these speeds, natural dead bait fish and imitation plastic lures are required because live bait fish cannot survive while being hooked and pulled at such speeds.

Clearly, the preferred method of offshore fishing is with live small bait fish. This type of fishing is done at drift or very slow speeds of zero to one mile per hour so that the hooked live bait fish can survive. Current teaser devices are ineffective at drift or very slow speeds because they rapidly sink as soon as the boat stops and becomes motionless.

For example, Gifford discloses, in his Publication No. US 2004/0159037, which was published on Aug. 19, 2004, a fishing device using a flat, clear, flexible, plastic sheet having two-dimensional bait fish decals adhered on the surface of the sheet and also having a rigid bar at its leading edge. The fishing device may be used in moving water, such as a stream or river, where the fishing device remains relatively stationary and the water moves past it to create an image of a school of fish in the water and also to keep the fishing device afloat. Although Gifford states in his paragraph [0010] that his fishing device may also be used in still water, such as a lake or pond, it will not work there because he does not use a second floatable spreader bar at or near the end of the plastic sheet to prevent the sheet from collapsing and sinking. Furthermore, Gifford makes no suggestion about replacing his two-dimensional bait fish decals with three-dimensional bait fish, whether imitation, live or dead, on or under the plastic sheet.

Kilander in his U.S. Pat. No. 5,950,345, which was issued on Sep. 14, 1999, discloses a fishing lure having a collar to which a transparent sheet is looped to form a cylindrical wind sock. Two-dimensional bait fish indicia are affixed to the sheet. The fishing device gives the impression of a school of swimming fish when pulled through the water. A cut extending around the tail of each indicia makes the tail flip to provide life-like action of each indicia.

Wisenhunt in his U.S. Pat. No. 5,752,461, which was issued on May 19, 1998, shows in his FIG. 1 the use of a pair of teaser lines extending from outriggers in combination with parallel hooked lines.

Layson in his U.S. Pat. No. 4,550,518, which was issued on Nov. 5, 1985, discloses a pair of thin, transparent, plastic sheets which are vertically oriented in shallow water and to which several different kinds of three-dimensional fish images are stacked therebetween.

Layson describes in his U.S. Pat. No. 3,186,120, which was issued on Jun. 1, 1965, a transparent, waterproof, flexible, plastic sheet vertically oriented in shallow water of a lake or stream and configured to carry a plurality of three-dimensional fish images intended as decoys to attract real fish.

Thus, it remains a problem in the prior art to provide a teaser apparatus for successfully attracting large target fish to a teaser device behind a boat during offshore fishing.

SUMMARY OF THE INVENTION

A teaser apparatus tethered to a drifting boat while offshore fishing has a flat, transparent, substantially horizontally oriented, plastic sheet to which a plurality of small, three-dimensional, imitation fish is attached to attract larger target fish, such as marlins, sailfish, swordfish, tuna and the like.

A primary, clear, plastic, spreader bar, which may be floatable, is attached to a leading edge of the sheet which may have any shape, e.g., square, rectangular, trapezoidal, six-sided and the like.

A secondary, clear, plastic, spreader bar, which may also be floatable, is attached near or at a trailing edge of the sheet to prevent the sheet from collapsing. If this secondary spreader bar is placed near but not at the trailing edge of the sheet, the secondary bar creates a flapping motion of an aft portion of the sheet.

If the secondary bar is placed near but not at the trailing edge, an optional tertiary, clear, plastic, spreader bar, which may likewise be floatable, may be attached at the trailing edge of the sheet to aid in the floatation of the entire sheet which may or may not itself be floatable.

The small, three-dimensional, imitation fish are preferably made of flexible rubber and may be attached either on a top surface of or to an underside of the sheet. The underside is the preferred surface of attachment.

It is a primary object of the invention to provide a teaser apparatus which will float on the surface of the water and eventually will settle slightly below the surface of the water so that the imitation school of fish will appear more realistic to the target fish.

This object and other advantages of the present invention will become more readily apparent after the reader studies the following detailed description of the preferred embodiments while viewing the accompanying drawings.

BRIEF DESCRIPTION OF THE DRAWINGS

The illustrative embodiments may be best described by reference to the drawings briefly described below.

FIG. 3 shows a side elevational view of the first embodiment of the teaser apparatus with a first embodiment of two spreader bars seen in their L-shaped end views.

FIG. 4a shows an end view of a second embodiment of the spreader bar with its circular end cap removed.

FIG. 4b shows an end view of a third embodiment of the spreader bar with its oval-shaped end cap removed.

FIG. 4c shows an end view of a fourth embodiment of the spreader bar with its triangular end cap removed.

DETAILED DESCRIPTION OF THE PREFERRED EMBODIMENTS

Figure 1:
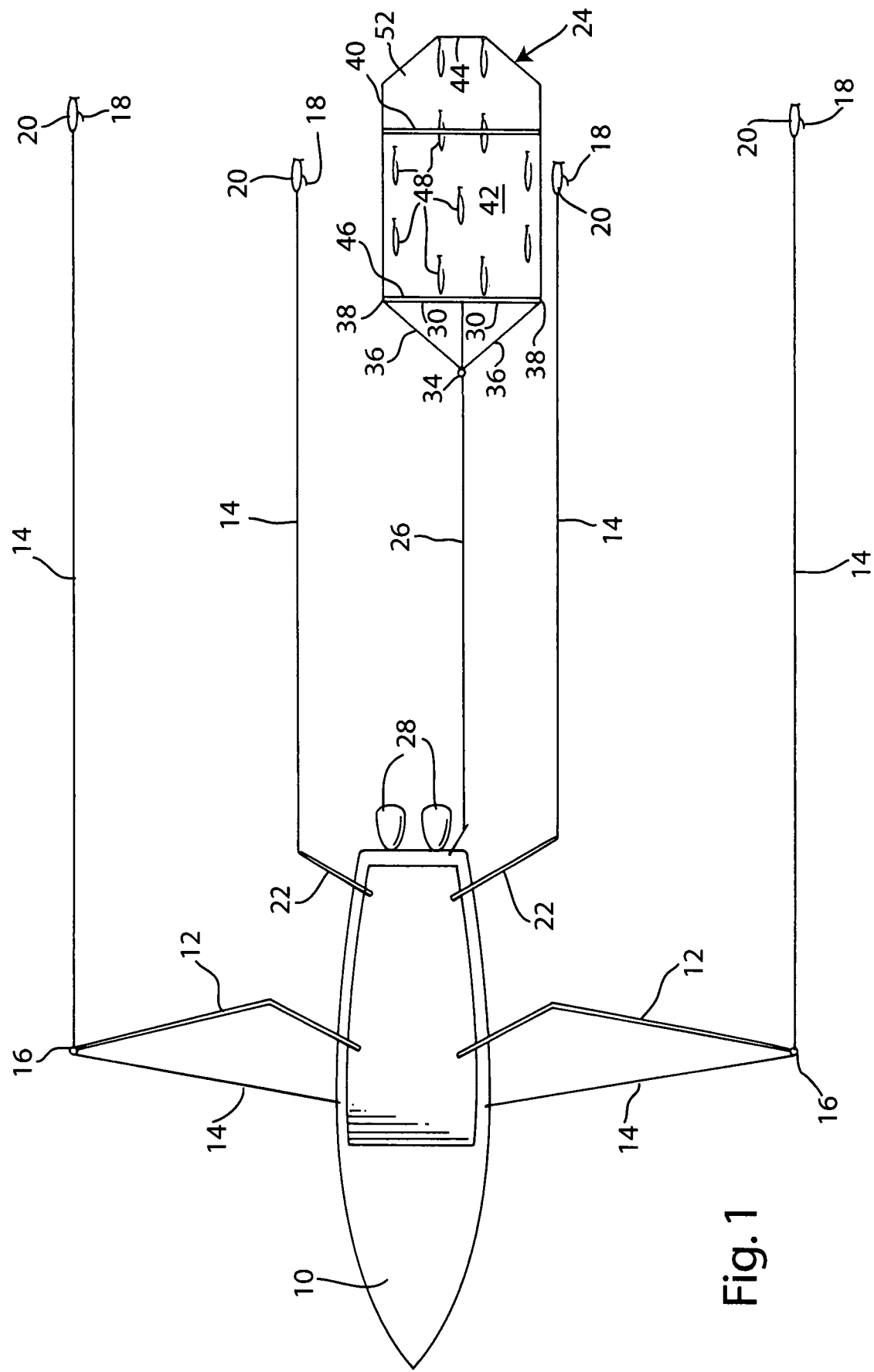
FIG. 1 shows a top plan view of a first embodiment of the teaser apparatus tethered behind a drifting boat.

Referring now to the drawings, the first and second embodiments of the teaser apparatus of the present invention will be described in detail.

In FIG. 1, there is illustrated a boat 10 from which one or more persons position themselves for offshore sport fishing. A pair of booms, commonly called outriggers 12, extend from each side of the boat 10. A fishing line 14 is attached to each side of the boat 10 and is secured to an end tip 16 of each outrigger 12. At the end of each fishing line 14, there is a hook 18 to which a small live bait fish 20 is attached.

Similarly, plural fishing poles 22 are placed over the sides of the boat 10. In FIG. 1, only two fishing poles 22 are illustrated for the sake of simplicity. These fishing poles 22 are usually the rod and reel type. From the poles 22, additional lines 14 extend with hooks 18 at their ends for securing small live bait fish 20 thereto.

A teaser apparatus 24, which is a first embodiment of the present invention, is tethered behind the boat 10 by a clear, plastic, primary, monofilament line 26 while the boat 10 is drifting with the current. Because outboard motors 28 are not running and not making noise, large target fish are not scared away from the boat 10.

The primary monofilament line 26 is attached at one end to the boat 10 and at its other end to a center 32 of a primary spreader bar 30. A ring clamp 34, a knot or another type of fastener is secured to the primary monofilament line 26 near to the center 32 of the primary spreader bar 30. Secondary monofilament lines 36 extend tightly from either the ring clamp 34 or the primary monofilament line 26 itself via a knot to opposite ends 38 of the primary spreader bar 30 to keep the teaser apparatus 24 from swaying behind the boat 10.

A secondary spreader bar 40 is attached near to a trailing edge 44 of a clear, plastic, horizontally oriented, flexible sheet 42 which has a natural floating tendency. A leading edge 46 of the sheet 42 is secured along a back side of the primary spreader bar 30. Because the secondary spreader bar 40 is attached near and not at the trailing edge 44 of the sheet 42, the secondary spreader bar 40 prevents the sheet 42 and its aft portion 52 from collapsing in the water.

A plurality of small, three-dimensional, imitation bait fish 48 is attached, preferably by nontoxic glue, either on top of a surface of or underneath the sheet 42. The three-dimensional imitation fish 48 are preferably made of lightweight flexible rubber. Although the fish 48 are preferably attached to an underside of the sheet 42, the fish 48 are shown on top of the sheet 42 in FIG. 2.

Figure 2:
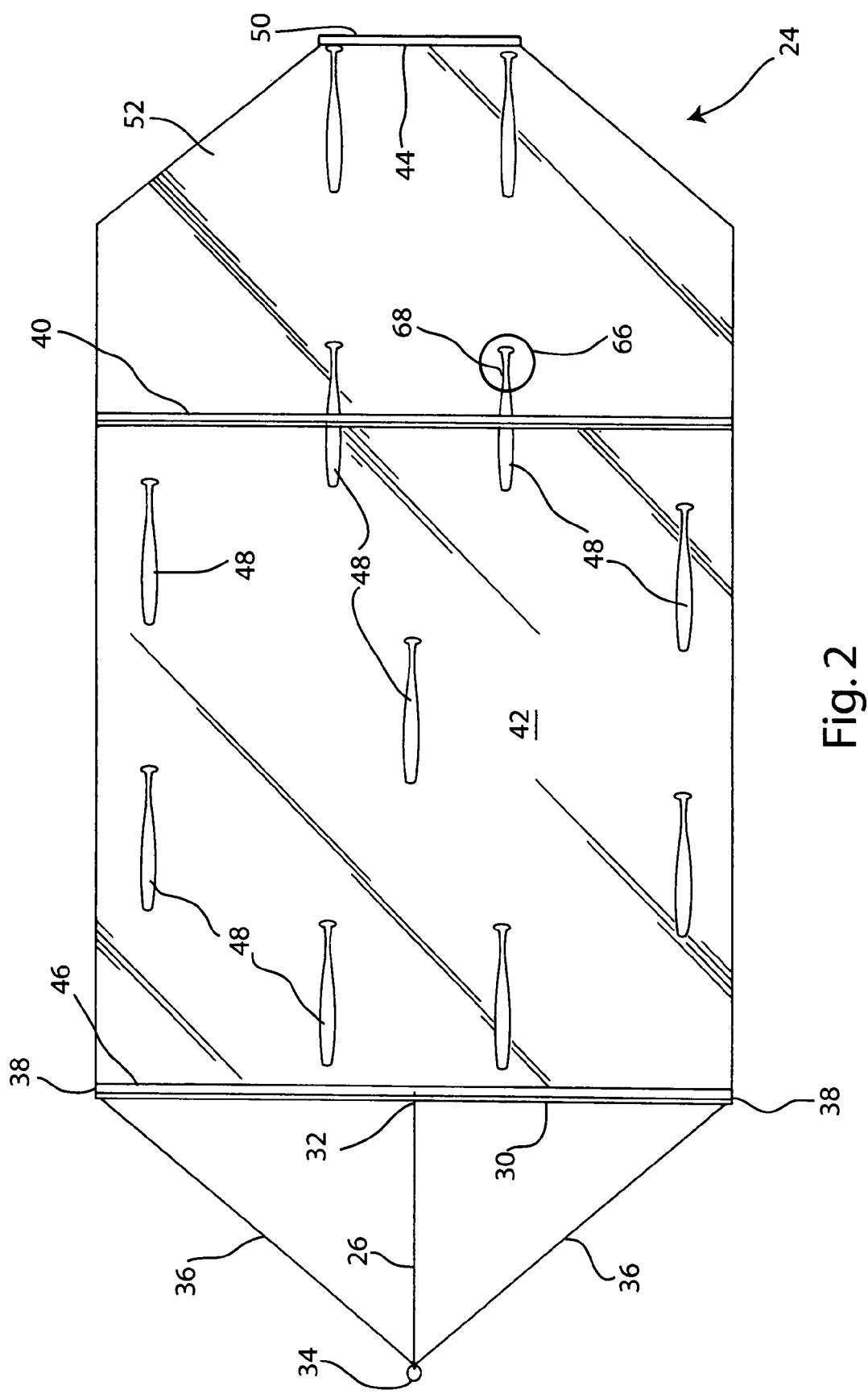
FIG. 2 shows a top plan view of a second embodiment of the teaser apparatus with three spreader bars attached to a clear plastic sheet.

In FIG. 2, there is illustrated a second embodiment of the teaser apparatus 24 in which the primary monofilament line 26, the primary spreader bar 30, the center 32 of the bar 30, the ring clamp 34, the secondary monofilament lines 36, the opposite ends 38 of the bar 30, the secondary spreader bar 40, the flexible sheet 42, the trailing edge 44 of the sheet 42, the leading edge 46 of the sheet 42, the plurality of three-dimensional imitation fish 48 and the aft portion 52 of the sheet 42 are the same as those elements illustrated in FIG. 1 showing the first embodiment.

In FIG. 2, the second embodiment has an optional tertiary spreader bar 50 attached to the trailing edge 44 of the sheet 42 to assist the primary spreader bar 30 and the secondary spreader bar 40 in keeping the entire sheet 42 afloat.

Besides the addition of the tertiary spreader bar 50 which may be floatable, the second embodiment seen in FIG. 2 has small circular cut-out portions 66 in the sheet 42. These cut-out portions 66 are made around tails 68 of either some or all of the fish 48 attached to the sheet 42. The presence of the cut-out portions 66 allows water flowing therethrough to impart a sideways flipping motion to the tails 68 of the fish 48 so that the fish 48 appear to be swimming. Only one cut-out portion 66 is shown in FIG. 2 for the sake of simplicity. Although the cut-out portion 66 is seen to be circular, it may have other shapes, e.g. semicircular. Also, although not shown in FIG. 1, the first embodiment may likewise have such cut-out portions 66 in the sheet 42.

FIG. 3 is a side elevational view of the first embodiment of the teaser apparatus 24 illustrated in FIG. 1. All elements illustrated in FIG. 3 are already seen in FIG. 1. These elements are, from front to back of the teaser apparatus 24, the ring clamp 34, one of the secondary monofilament lines 36, one end 38 of the primary spreader bar 30, the plurality of three-dimensional fish 48 attached to the underside of the sheet 42, the secondary spreader bar 40, and the aft portion 52 of the sheet 42. In FIG. 3, the cross sections of the primary spreader bar 30 and the secondary spreader bar 40 are L-shaped. The L-shaped cross section also is the shape for the tertiary spreader bar 50 in FIG. 2. This L-shape is presently a first preferred form for the cross section of the spreader bars 30, 40 and 50.

In FIG. 4a, a second preferred form for the cross sections of the spreader bars 30, 40 and 50 is shown. Specifically, on the right side of FIG. 4a, the end 38 is circular so that each spreader bar 30, 40 and 50 is a hollow, cylindrical tube. On the left side of FIG. 4a, there is illustrated a circular end cap 54 with a square finger grip 56 for sealing the end 38 of the cylindrical spreader bars 30, 40 and 50 to prevent water from entering and causing the cylindrical spreader bars 30, 40 and 50 to sink. Because the cap 54 is circular, the inside of the ends 38 of the spreader bars 30, 40 and 50 may be threaded to allow removal of the cap 54 by unscrewing.

In FIG. 4b, a third preferred form for the cross sections of the spreader bars 30, 40 and 50 is shown. Specifically, on the right side of FIG. 4b, the end 38 is oval-shaped so that each spreader bar 30, 40 and 50 is a hollow tube. On the left side of FIG. 4b, there is an oval-shaped end cap 58 with a square finger grip 60 for sealing the oval-shaped end 38. Although the finger grip 60 in FIG. 4b and the finger grip 56 in FIG. 4a are square, the grips 56 and 60 may have any shape which allows a user to grip the caps 54 and 58 by pulling them from the opposite ends 38 of the tubular spreader bars 30, 40 and 50.

In FIG. 4c, a fourth preferred form for the cross sections of the spreader bars 30, 40 and 50 is shown. Specifically, on the right side of FIG. 4c, the end 38 is triangular so that each spreader bar 30, 40 and 50 is a hollow tube. On the left side of FIG. 4c, there is a triangular end cap 62 with a cylindrical finger grip 64 for sealing the triangular end 38. Although the finger grip 64 is cylindrical, it may have any other suitable shape, e.g. square.

The operation of the teaser apparatus 24 may be generally described as follows. The inventor has developed a way to present a school of imitation bait fish 48 underneath the teaser apparatus 24 with struggling small live bait fish 20 at a distance therefrom. This array of imitation fish 48 and live fish 20 presented to large target fish is done at drift or very slow speeds, e.g. one mile per hour or less, for the boat 10. With the primary spreader bar 30 and the secondary spreader bar 40 keeping the clear plastic sheet 42 flat, i.e., horizontally oriented, the teaser apparatus 24 stays on top of the water while the boat 10 is drifting. The imitation bait fish 48 attached to the underside of the sheet 42 appear to have a natural swimming appearance. After a while when the boat 10 is drifting or is stopped, the teaser apparatus 24 starts to settle slowly a few feet below the surface. By placing the boat 10 back in gear to achieve a very slow speed of about one mile an hour and certainly less than six miles per hour, the teaser apparatus 24 rises quickly to the surface of the water to resemble a jumping school of panicked live small bait fish, thus drawing strikes on the struggling fish 20 from the large target fish and also sometimes from other normally uninterested large fish loitering nearby.

The present invention has been shown in its two preferred embodiments. As mentioned in the foregoing description, other embodiments will occur to other persons skilled in this particular technology. Thus, it should be apparent to those persons that the invention is not limited to the preferred embodiments. Consequently, the disclosed embodiments may be changed or modified without departing from the spirit and scope of the invention, as it is defined in the appended claims.

I claim:

1. A teaser apparatus for fishing, comprising:
   a. a flat, transparent, substantially horizontally oriented, plastic sheet having a natural floating tendency, a leading edge, a trailing edge, a top surface and an underside;
   b. a primary spreader bar attached to the leading edge of the sheet;
   c. a secondary spreader bar attached at or near the trailing edge of the sheet; and
   d. a plurality of three-dimensional, imitation fish attached to the sheet;
      wherein the sheet has cut-out portions near tails of the imitation fish.

2. A teaser apparatus according to claim 1, wherein the secondary spreader bar is attached near the trailing edge of the sheet.

3. A teaser apparatus according to claim 2, further comprising:
   e. a tertiary spreader bar attached at the trailing edge of the sheet.

4. A teaser apparatus according to claim 3, wherein the primary, secondary and tertiary spreader bars are made of clear plastic.

5. A teaser apparatus according to claim 4, wherein the primary, secondary and tertiary spreader bars have L-shaped cross sections.

6. A teaser apparatus according to claim 4, wherein the primary, secondary and tertiary spreader bars are tubes with opposite ends.

7. A teaser apparatus according to claim 6, wherein the tubes have circular cross sections.

8. A teaser apparatus according to claim 6, wherein the tubes have oval-shaped cross sections.

9. A teaser apparatus according to claim 6, wherein the tubes have triangular cross sections.

10. A teaser apparatus according to claim 6, further comprising:
    end caps on the opposite ends of the tubes.

11. A teaser apparatus according to claim 10, wherein the end caps have finger grips.

12. A teaser apparatus according to claim 3, wherein the primary, secondary and tertiary spreader bars are floatable.

13. A teaser apparatus according to claim 1, wherein the imitation fish are attached to the top surface of the sheet.

14. A teaser apparatus according to claim 1, wherein the imitation fish are attached to the underside of the sheet.

15. A teaser apparatus according to claim 1, wherein the cut-out portions are circular in shape.

16. A teaser apparatus according to claim 1, further comprising:
    a primary monofilament line attached to a center of the primary spreader bar.

17. A teaser apparatus according to claim 16, further comprising:
    secondary monofilament lines extending from the primary monofilament line to opposite ends of the primary spreader bar.

18. A teaser apparatus according to claim 16, wherein the primary monofilament line is tethered behind a boat for offshore fishing.

19. A teaser apparatus according to claim 1, wherein the imitation fish are made of flexible rubber.

\* \* \* \* \*